3,252,966
PREPARATION OF BLOCK AND GRAFT COPOLYMERS BY PHOTOPOLYMERIZATION IN THE PRESENCE OF A PHOTOSENSITIZING DYESTUFF AND A REDUCING AGENT
Walter Frans De Winter, Mortsel-Antwerp, Belgium, assignor to Gevaert Photo-Producten N.V., Mortsel, Belgium, a Belgian company
No Drawing. Filed Sept. 11, 1961, Ser. No. 144,279
Claims priority, application Belgium, June 23, 1961, 605,315
20 Claims. (Cl. 204—158)

The present invention relates to a new method for preparing polymeric compounds by photopolymerization, more particularly to the preparation of graft-copolymers and block-copolymers.

It is known to prepare polymeric compounds by photopolymerization of vinyl compounds, the photopolymerization being sensitized in the visible range of the spectrum with dyestuffs (Oster: Nature 173, 300 (1954)).

It has now been found that polymeric compounds can be prepared by photopolymerization by using polymeric compounds bearing chemically linked photosensitizing dyestuffs. During this photopolymerization graft-copolymers and block-copolymers are formed showing interesting properties.

According to the present invention a block copolymerized and graft-copolymerized macromolecular compound is obtained by photopolymerization, by reacting a macromolecular compound containing amino groups with a photosensitizing dyestuff and by photopolymerizing at least one ethylenically unsaturated polymerizable compound containing at least one $CH_2=C<$ group, in the presence of the obtained macromolecular compound bearing chemically linked photosensitizing dyestuff groups and of a reducing compound.

By photosensitizing dyestuffs must be understood dyestuffs the presence of which accelerates, under the influence of light, the polymerization of ethylenically unsaturated polymerizable compounds containing at least one $CH_2=C<$ group. As photosensitizing dyestuffs may be mentioned e.g., eosine, safranine and acridine orange.

As polymer containing amino groups, suitable to be used in the preparation of polymers bearing chemically linked photosensitizing dyestuff groups, poly(vinylamine) may be particularly considered. Other polymers containing amino groups e.g. poly(ethylene imine), poly(vinylaniline), and their copolymers may be used according to the process of this invention.

Another group of polymers containing amino groups, which may be considered for use in the reaction according to the present invention, consists of polymers containing a terminal amino group. These polymers may be obtained, e.g., by polymerization of ethylenically unsaturated polymerizable compounds in the presence of ammonia or of a primary amine (British patent specification 787,344). In this way, e.g., styrene may be polymerized in the presence of liquid ammonia whereby a polymer with terminal primary amino groups is obtained. Other monomers, e.g., vinyl toluene, methyl methacrylate, ethyl methacrylate, acrylic acid and esters thereof, vinyl chloride, vinyl acetate, vinylidene chloride, butadiene, acrylonitrile, and methacrylonitrile, may be polymerized in the same way, and may also be copolymerized mutually or with other ethylenically unsaturated compounds.

For implanting the photosensitizing dyestuff into the chain of the polymer, e.g., eosine in the form of its sodium salt is esterified with monochloromethyl ether. This reaction scheme is described by Schwyzer and Iselin in Helv. Chim. Acta, 38, 69 (1955), and 39, 57 (1956). The esterified eosine molecules react very easily with amines, while splitting off formaldehyde and methanol, so that amides are formed. The reaction with poly(vinylamine) may be represented as follows:

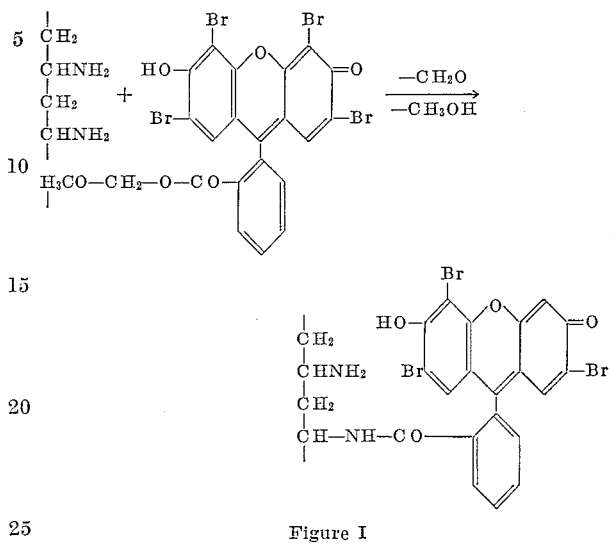

Figure I

This condensation is based on the great reactivity of the hemiacetal-ester function.

For facilitating the reaction of poly(vinylamine) is used in the reaction in the form of its hydrochloride.

When the polymeric compound, which contains chemically linked dyestuff groups, is submitted to an infrared spectrographic test, the characteristic absorption band of the —CO—NH— group was found at 1650 cm.$^{-1}$ and also a shift of the absorption band occurred in the visible spectrum from 518 to 531 µu. Now 518 µu is the wavelength of the absorption maximum of eosine and in view of the absence of this characteristic absorption band one may conclude that the dyestuff is really chemically linked to the polymer.

According to another simpler method for preparing the polymeric compound having chemically linked dyestuff groups, poly(vinylamine) is treated with eosine lactone. This latter is prepared by acidifying an aqueous solution of eosine with hydrochloric acid. At pH 1.5 the water-soluble lactone corresponding to the formula precipitates:

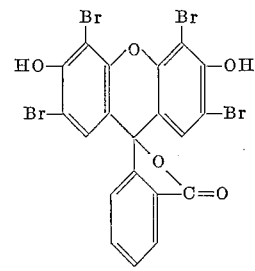

Figure II

If a solution of this lactone in dioxane or acetone is added to an aqueous poly(vinylamine) solution, a reaction immediately starts and, while splitting off water, the dyestuff bearing polymer represented in FIG. 1 is obtained.

In order to show the reaction of implanting the photosensitizing dyestuff into a polymer having a terminal amino group, e.g., poly(methyl methacrylate) having a terminal amino group is used. This was prepared by anionic polymerization of the monomer at —40° C. in an ammoniacal solution of sodium amide as initiator (Higginson and Wooding: J. Chem. Soc. (1952), 760).

This poly(methyl methacrylate) having terminal amino groups is treated with the eosine lactone according to FIGURE 2. The reaction is illustrated by the following scheme:

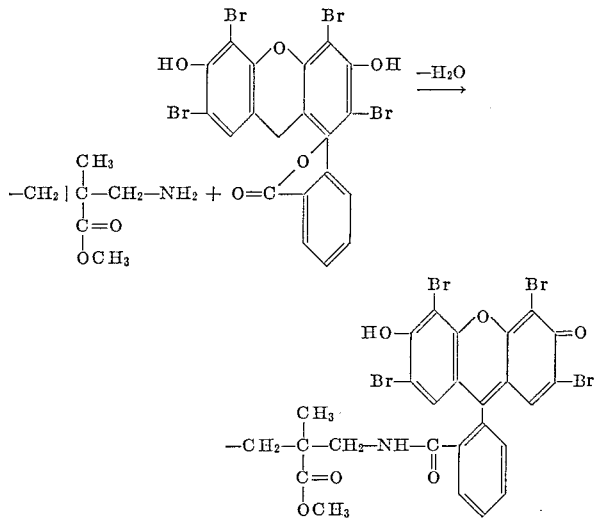

Figure III

The reaction may be followed by controlling the increase in weight and by a bromine determination of the end polymer. A further proof that the dyestuff is chemically linked to the polymer is given by the fact that on extracting a solution of the colored polymer in methyl ethyl ketone with an aqueous sodium hydroxide solution, no dyestuff passes into the aqueous layer. This shows that no more free eosine lactone is present in the solution. In a similar extraction this form of dyestuff would be converted into a sodium salt and pass into the aqueous phase.

The polymeric compounds bearing chemically linked photosensitizing dyestuff groups are now used as photosensitizers in the presence of a reducing compound for the preparation of graft-copolymers and/or block-copolymers. As monomers all the compounds which contain at least one $CH_2=C<$ group are considered suitable.

On using the reaction product of a photosensitizing dyestuff with a polymer containing amino groups which are distributed along the polymeric chain in a further photopolymerization reaction, the implanted photosensitizing dyestuff groups will also be distributed along the polymeric chain and graft-copolymers containing ethylenically unsaturated polymeric compounds will be obtained.

If, however, one starts from polymers containing terminal amino groups, block copolymers will result.

The polymeric compounds bearing chemically linked photosensitizing dyestuffs will be designated from now on throughout the description as "dyestuff-containing polymers."

The photopolymerization is carried out by irradiation of an aqueous solution of a dyestuff-containing polymer in the presence of a reducing compound and of ethylenically unsaturated polymerizable compounds which contain at least one $CH_2=C<$ group. Generally, ascorbic acid is used as reducing agent, but other reducing compounds as, e.g., thiourea, are also suitable for this purpose.

During the fractionation of the polymer thus obtained it was observed that on reaching the gamma value of the pure homopolymer of the ethylenically unsaturated polymeric compound, which was originally present in the aqueous solution, no precipitate was obtained. This proves that no homopolymer from this monomer has been formed.

By gamma value the following ratio is understood:

$$\gamma = \frac{\text{amount of precipitating agent}}{\text{amount of solvent} + \text{amount of precipitating agent}}$$

Further analysis of the two fractions obtained at the other gamma values shows that one of these fractions consists of unmodified dyestuff-containing polymer, while the other fraction is a graft-copolymer and/or a block-copolymer of the polymer and the monomeric compound present.

By I.R. spectrography, U.V. spectrography and conductometric titration can be shown that a graft-copolymer and/or a block-copolymer was obtained.

This method for preparing graft-copolymers from a polymer and a monomeric compound may also be used for obtaining double graft-copolymers. If, specifically, a second ethylenically unsaturated polymerizable compound is added to a graft copolymer obtained according to the present method and still containing sensitizing dyestuff, and if this mixture is treated in the same way, then a double graft-copolymer is obtained.

The graft and block copolymers of the present invention can be used in the formulation of coating layers in photographic materials such as in anti-halation layers, in subbing layers between the film base and the light-sensitive emulsion, in filter layers, anti-stress layers and the like.

The following examples illustrate the invention without limiting, however, the scope thereof.

EXAMPLE 1

A. *Preparation of poly(vinylamine hydrochloride)*

This polymer is prepared according to the method of R. Hart, J. Polymer Sci. 29, 629 (1958) by refluxing 10 g. of poly(vinyl-tert-butylcarbamate) in 100 cm.³ of 2.5 N hydrochloric acid. The polymer gradually dissolves during the reaction. After 7 hrs. of refluxing the formed poly(vinylamine hydrochloride) is precipitated in acetone and dried. Yield: 5.6 g.

The percentage of carbamate groups converted into amino hydrochloride is determined according to the method of Van Slijke and by conductometric titration of a solution of a lyophilized polymer. In both cases a poly(vinylamine hydrochloride) content of 98% is obtained.

B. *Preparation of poly(vinylamine) containing eosine*

By acidifying an aqueous solution of eosine to pH 1.5 with hydrochloric acid, eosine lactone is precipitated. 1.5 g. of eosine lactone dissolved in 10 cm.³ of dioxane are added to a solution of 1.5 g. of poly(vinylamine hydrochloride) in 30 cm.³ of water, previously neutralized with sodium hydroxide. The N-(eosine)-poly(vinylamine) precipitates; after acidification it is reprecipitated in acetone. This purification is repeated several times.

By means of infrared spectrum analysis a strong amide absorption band is found at 1650 cm.$^{-1}$. The visible light is absorbed at 531 mμ (free eosine 518 mμ). By conductometric titration it was determined that the N-(eosine)-poly(vinylamine) contained 1 eosine group per 10 vinylamine units.

C. *Grafting of acrylamide*

The polymerization is carried out by irradiating for 20 hours a solution of 0.75 g. of N-(eosine)-poly(vinylamine hydrochloride), 1.8 g. of acrylamide and 0.25 g. of ascorbic acid in 75 cm.³ of water. The ascorbic acid acts as a reducing agent. A tungsten lamp of 500 watt type Episcope Philips E 27-M.I.R. is used as a light source.

When fractionating with acetone an aqueous solution of the formed polymer, two large fractions are obtained at gamma values of respectively 0.55 (fraction A) and 0.70 (fraction B). At the gamma value of pure poly(acrylamide) no polymer could be isolated. Further analysis of the fractions shows that fraction B consists of 0.42 g. of unmodified N-(eosine)-poly(vinylamine hydrochloride) and that fraction A consists of 0.55 g. of a graft copolymer of poly(vinylamine hydrochloride) and poly(acrylamide).

U.V. spectra of fraction A show that this fraction contains poly(vinylamine hydrochloride). There is an absorption band at 212 m$\mu$ due to polyvinylamine and one at 265 m$\mu$ due to eosine. Conductometric titration of fraction A with N/10 sodium hydroxide indicates a poly(vinylamine hydrochloride) content of 40.7%.

EXAMPLE 2

Grafting of acrylic acid

A solution of 0.5 g. of N-(eosine)-poly(vinylamine hydrochloride) prepared according to Example 1, in a solution consisting of 60 cm.$^3$ of water, 2.5 g. of acrylic acid and 0.15 g. of ascorbic acid, is irradiated for 16 hrs. The polymer so formed is isolated by means of lyophilization. Yield: 0.800 g.

By adding acetone to an aqueous solution of a mixture of 500 mg. of N-(eosine)-poly(vinylamine hydrochloride) and 500 mg. of poly(acrylic acid) a precipitate of 500 mg. of polymer is obtained at gamma value=0.70. The infrared spectrum analysis shows that this precipitate consists of pure N-(eosine)-poly(vinylamine hydrochloride). A further addition of acetone causes no further precipitate.

If, however, instead of this mixture the above formed polymer is submitted to a similar treatment, no precipitate is obtained; consequently there is no N-(eosine)-poly(vinylamine hydrochloride) present anymore.

From a mixture, in solid state, of poly(vinylamine hydrochloride) and poly(acrylic acid), the latter may be extracted with acetone.

From the polymer obtained by means of lyophilization nothing can be extracted with acetone and consequently in this polymer no homopoly(acrylic acid) is present.

A conductometric titration of the graft copolymer shows a poly(acrylic acid) content of 37%, which corresponds to the increase in weight by copolymerization. A Kjeldahl nitrogen determination gives a poly(vinylamine hydrochloride) content of 61.7%, which concurs with the results of the conductometric titration.

EXAMPLE 3

Grafting of acrylonitrile

The graft-copolymerization is carried out by irridiating for 1 hour a solution of 500 mg. of N-(eosine)-poly(vinylamine hydrochloride), prepared according to example 1B, 3 g. of acrylonitrile and 150 mg. of ascorbic acid in 60 cm.$^3$ of water. A first fraction A of 100 mg. is precipitated and is isolated by filtration. A second fraction B of 600 mg. which is the remainder of the polymer is obtained by lyophilization.

Pure poly(acrylonitrile) is insoluble in water. By adding acetone to an aqueous solution of the polymer fraction B, the polymer is completely precipitated by a gamma value of 0.6. Pure N-(eosine)-poly(vinylamine hydrochloride), however, only precipitates by a gamma value of 0.7. Accordingly, the fraction B consists of a graft-copolymer.

The infrared spectrum of fraction A showing only the characteristic absorption band of the CN-group at 2225 cm.$^{-1}$, this fraction consists of pure poly(acrylonitrile). On the other hand, the polymeric fraction B shows a weak absorption band at 2225 cm.$^{-1}$ and a strong absorption band at 1670 cm.$^{-1}$ which is characteristic of the NH$_2$ group. Thus fraction B consists of a graft-copolymer of poly(vinylamine hydrochloride) and poly(acrylonitrile). A conductometric titration of fraction B with N/10 sodium hydroxide shows a poly(vinylamine hydrochloride) content of 86% which corresponds to the increase in weight due to polymerization.

EXAMPLE 4

Grafting of styrene

The photopolymerization is carried out by irradiating a solution of 600 mg. of N-(eosine)-poly(vinylamine hydrochloride), prepared according to example 1B, 3 g. of styrene and 50 mg. of ascorbic acid (previously dissolved in a few drops of water) in 25 cm.$^3$ of glacial acetic acid. By pouring the solution into water a polymeric fraction A is obtained. By lyophilization of the water/acetic acid filtrate 320 mg. of the polymer fraction B is isolated.

The fraction B is examined by means of three different methods of analysis: infrared spectrography, nitrogen determination according to Kjeldahl and conductometric titration. These three methods prove that this fraction consists of unmodified N-(eosine)-poly(vinylamine hydrochloride).

The fraction A is partially dissolved in methyl ethyl ketone. The infrared spectrum analysis of this dissolved part indicates a polystyrene content of 97%. The undissolved part is examined by infrared spectrography and by the nitrogen determination according to Kjeldahl. These analyses indicate that it is a graft-copolymer containing 36% of the polystyrene, which result entirely corresponds with the increase in weight due to copolymerization.

EXAMPLE 5

Grafting of acrylamide and acrylic acid

If a graft copolymer of poly(vinylamine hydrochloride) and poly(acrylamide) is prepared according to the method of Example 1, but by choosing the ratios of these compounds in such a way that in the final graft-copolymer a ratio of 60/40 is obtained, then this graft-copolymer still has a red color, which proves the presence of free dyestuff groups. An aqueous solution of the colored graft copolymer is then irradiated for 16 hours in the presence of acrylic acid and ascorbic acid. The formed graft-copolymer is isolated and the different fractions are separated as in Example 1C. This double graft-copolymer contains 67% of acrylic acid, 19% of vinylamine hydrochloride and 13.2% of acrylamide.

EXAMPLE 6

A. Preparation of poly(methyl methacrylate) with terminal amino groups

In a three-necked flask, which is immersed in a solution of solid carbon dioxide in acetone at −40° C., are condensed 70 cm.$^3$ of anhydrous ammonia dried in a calcium chloride tube, whereafter 0.4 g. of metallic sodium is added. The metal dissolves and a blue homogeneous liquid is obtained.

Whilst stirring 18 cm.$^3$ of methyl methacrylate are added. Immediately the blue color disappears and a white precipitate is formed in the flask. A little ammonium chloride is added in order to decompose the residual sodium salts and the ammonia is allowed to evaporate. The residue is dissolved in toluene and filtered off. The filtrate is poured into petroleum naphtha and the precipitated polymer is isolated. In order to obtain the polymer in powdery form, it is redissolved in acetone, precipitated in a mixture of methanol and water (50:50), isolated and dried.

B. Preparation of poly(methyl methacrylate) containing eosine 1.5 g. of poly(methyl methacrylate) having terminal amino groups, and obtained according to Example 6A, are dissolved in a solution of 300 mg. of eosine lactone in 30 cm.$^3$ of butanone. The solution is poured into 150 cm.$^3$ of a mixture of methanol and water (50/50). The polymer is precipitated and is then several times redissolved and reprecipitated in order to eliminate the absorbed free eosine. When extracting a butanone solution of this purified polymer by means of aqueous sodium hydroxide, no dyestuff is absorbed anymore by the aqueous layer. The infrared spectrum analysis shows a strong amide absorption band at 1650 cm.$^{-1}$. The content of eosine groups, found by a bromine determination according to Wurschmitt, amounts to 1 eosine molecule per 48 methyl methacrylate groups.

C. Block copolymerization of styrene

The block-copolymerization is carried out by irradiating different solutions consisting each of 12 cm.$^3$ of acetic acid, 0.6 g. of poly(methyl methacrylate) containing eosine, 3 g. of styrene and 150 mg. of thiourea as a reducing agent.

The photochemically prepared block copolymers are fractionated by gradually adding methanol to a 2% polymer solution in chloroform at 25° C. In this way poly-(styrene) and poly(methyl methacrylate) precipitate at gamma values of respectively 0.42 and 0.78. On the other hand the block copolymer possesses an intermediate solubility and precipitates at gamma values of between 0.58 and 0.7. From mixtures of these polymers no precipitate is obtained in this range. The following table illustrates the results of the different solutions for polymerization.

FRACTIONATION OF BLOCK COPOLYMERS OF STYRENE AND POLY(METHYL METHACRYLATE) CONTAINING EOSINE

| Solution | Irradiation time in hours | Isolated Polymer | | | |
| --- | --- | --- | --- | --- | --- |
| | | Homo | | Block | |
| | | Poly(methyl methacrylate) containing eosine in mg. | Poly (styrene) in mg. | Total in mg. | Poly(methyl methacrylate) in percent |
| 1 | 3½ | 440 | 55 | 265 | 62 |
| 2 | 4 | 410 | 120 | 280 | 55 |
| 3 | 5 | 410 | 140 | 275 | 61 |
| 4 | 7 | 350 | 215 | 435 | 57 |

The both polymer contents in the block-copolymers are determined by infrared spectrum analysis in percents of weight.

The table shows an increase in weight of polymer as irradiation times increase.

The block-copolymers thus obtained are submitted to an acidic hydrolysis in order to break the amide bond which links the two polymeric chains. After hydrolysis, the two homopolymers of the residual non-hydrolyzed block-copolymers are separated according to the fractionating method described above. The ratio of the weights of the obtained homopolymers is the same as that of the starting block-copolymers, which shows that block copolymerization occurred indeed.

This hydrolysis is carried out as follows: 1.090 g. of a block-copolymer is heated for 2 hrs. at 98° C. in a mixture of 100 cm.$^3$ of dioxane, 10 cm.$^3$ of water and 1 cm.$^3$ of 0.1 N sulphuric acid. Then the polymer is precipitated in a mixture of methanol and water (50/50) and fractionated by means of the chloroform/method system as described above.

EXAMPLE 7

*Block-copolymerization with acrylamide*

The block-copolymerization is carried out by irradiating for 14 hrs. solution of 400 mg. of eosine-containing poly-(methyl methacylate), 1.5 g. of acrylamide and 150 mg. of thiourea as a reducing agent in 13 cm.$^3$ of glacial acetic acid.

By pouring the solution into methanol and filtering, 600 mg. of the polymer fraction A are obtained.

If water is added to the filtrate, 250 mg. of a polymeric fraction B can be isolated. This latter fraction contains no acrylamide and consists of unmodified poly (methyl methacrylate) containing eosine.

Fraction A is insoluble in butanone but soluble in water. On adding acetone to its aqueous solution no precipitate is formed; this is contrasted with poly(acrylamide). It may be concluded therefrom that it contains neither free poly(methyl methacrylate) nor poly(acrylamide). By infrared spectrum analysis and nitrogen determination according to Kjeldahl the poly(acrylamide) content of fraction A was found to be 79%.

What I claim is:

1. The process for preparing high molecular weight polymers selected from the group consisting of block and graft copolymers which process comprises reacting a polymeric compound containing free amino groups with a photosensitizing dyestuff to form a derivative of said polymeric compound wherein the dyestuff is chemically linked through the amino group to the polymeric compound, adding a polymerizable ethylenically unsaturated monomer and a reducing agent and subjecting the resulting mixture to photopolymerization to form said selected high molecular weight polymer wherein a monomer is chemically linked onto said polymeric derivative.

2. A process according to claim 1 in which the product is subjected to a further photopolymerization step employing additional reducing agent and a second polymerizable ethylenically unsaturated monomer, whereby a double graft-copolymer is produced.

3. A process according to claim 1 in which the polymeric compound containing free amino groups is poly (vinylamine).

4. A process according to claim 1 in which the polymeric compound containing free amino groups is poly (ethylene imine).

5. A process according to claim 1 in which the polymeric compound containing free amino groups is poly (vinylaniline).

6. A process according to claim 1 wherein the photosensitizing dyestuff is eosine.

7. A process according to claim 1 wherein the photosensitizing dyestuff is acridine orange.

8. A process according to claim 1 wherein the photosensitizing dyestuff is safranine.

9. A process according to claim 1 wherein the polymerizable ethylenically unsaturated monomer is acrylamide.

10. A process according to claim 1 wherein the polymerizable ethylenically unsaturated monomer is acrylic acid.

11. A process according to claim 1 wherein the polymerizable ethylenically unsaturated monomer is styrene.

12. A process according to claim 1 wherein the polymerizable ethylenically unsaturated monomer is acrylonitrile.

13. A process according to claim 1 wherein the reducing agent is selected from the group consisting of thiourea and ascorbic acid.

14. A process for preparing a block copolymer which comprises reacting polymethyl methacrylate containing free amino groups with a photosensitizing dyestuff to form a derivative of said polymeric compound wherein the dyestuff is chemically linked through the amino group to the polymeric compound, adding a polymeric ethylenically unsaturated monomer and a reducing agent and subjecting the resulting mixture to photopolymerization to form said selected high molecular weight polymer wherein a polymeric chain formed from the ethylenically unsaturated monomer is chemically linked onto the polymeric derivative and the polymer formed has free terminal amino groups.

15. A process according to claim 14 in which the ethylenically unsaturated polymerizable compound which is polymerized in the presence of a compound selected from the group consisting of ammonia and a primary amine, is methyl methacrylate.

16. A process according to claim 14 in which polymerizable ethylenically unsaturated monomer is styrene.

17. A process according to claim 14 in which polymerizable ethylenically unsaturated monomer is acrylamide.

18. A process according to claim 1 wherein the photosensitizing dyestuff is selected from the group consisting of an eosine ester and an eosine lactone.

19. The process of claim 2 wherein the photosensitizing dyestuff is selected from the group consisting of an eosine ester and an eosine lactone.

20. The process of claim 14 wherein the photosensitizing dyestuff is selected from the group consisting of an eosine ester and an eosine lactone.

References Cited by the Examiner

UNITED STATES PATENTS

| | | | |
|---|---|---|---|
| 2,873,240 | 2/1959 | Miller | 204—158 |
| 2,875,047 | 2/1959 | Oster | 204—158 |
| 2,922,768 | 1/1960 | Mino et al. | 260—17.4 |
| 2,983,657 | 5/1961 | Gabilly et al. | 204—158 |
| 2,999,772 | 9/1961 | Burk et al. | 204—158 |
| 3,083,118 | 3/1963 | Bridgeford | 117—47 |

FOREIGN PATENTS 787,344  12/1957  Great Britain.

MURRAY TILLMAN, *Primary Examiner.*

JOSEPH REBOLD, JOHN H. MACK, *Examiners.*